United States Patent
Duncan et al.

(10) Patent No.: US 7,283,550 B2
(45) Date of Patent: Oct. 16, 2007

(54) VOICE AND DATA CALL ADMISSION POLICIES FOR A WIRELESS COMMUNICATION SYSTEM

(75) Inventors: Virgil J. Duncan, Livingston, NJ (US); George Edson Estes, Morristown, NJ (US); T. Roger Kiang, Basking Ridge, NJ (US); Mathew Thomas, Madison, NJ (US); Stanley Vitebsky, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1035 days.

(21) Appl. No.: 10/185,025

(22) Filed: Jun. 28, 2002

(65) Prior Publication Data

US 2004/0001437 A1  Jan. 1, 2004

(51) Int. Cl.
*H04Q 7/00* (2006.01)
(52) U.S. Cl. .................... 370/437; 455/452.1; 455/512
(58) Field of Classification Search ............... 370/437, 370/465; 455/452.1, 512
See application file for complete search history.

(56) References Cited

U.S. PATENT DOCUMENTS 6,760,594 B1 * 7/2004 Murasawa et al. .......... 455/512
7,020,110 B2 * 3/2006 Walton et al. .............. 370/334

* cited by examiner

*Primary Examiner*—Melvin Marcelo

(57) ABSTRACT

A method of applying one of several resource distribution algorithms to an incoming call to a communication system. The applied resource distribution algorithm is based on resource parameters obtained from a main scheduler of the communication system. Some of the resource parameters include the type of call, the resource usage and the resource allocation scheme. The resource parameters generally describe the amount of resources that are currently being used by the system and which resources are available to the incoming call. The method of the present invention admits the incoming call to the communication system in accordance with one of the resource distribution allocation schemes. In this manner, the resources of the communication system can be efficiently and fairly distributed to different types of users requesting admission to the communication system.

16 Claims, 2 Drawing Sheets

VOICE AND DATA CALL ADMISSION POLICIES FOR A WIRELESS COMMUNICATION SYSTEM

BACKGROUND OF THE INVENTION

1. Field of the Invention

This invention is generally related to communication systems and in particular to wireless communication systems.

2. Description of the Related Art

Communication systems, and in particular, wireless communication systems usually have limited amounts of various resources that can be allocated to users of such systems. Examples of resources include the amount of power allocated to a signal to be transmitted, the amount of bandwidth allocated to a particular signal and the rate at which data is transmitted for a particular signal. As users request admission to a communication system, the system will admit the users if there are sufficient resources available to adequately service the requesting users. Requesting users typically specify to the communication system the type and amount of resources they desire. Requesting users (or user equipment) usually utilize one or more signaling channels to communicate their resource specifications to the communication systems.

Hereinafter, the terms 'user' and 'user equipment' will be used interchangeably. The resource specifications are typically various parameters (e.g., data rate, transmit power, bandwidth) that the user equipment (e.g., cellular telephone, wireless pager, wireless personal computer) transmit to the system equipment to allow the system equipment to determine whether there are sufficient resources available to properly service the requesting user equipment. The system equipment are typical communication equipment (e.g., transmitters, radios, amplifiers, modulators, processors) used in wireline or wireless communication systems. The system equipment are typically owned, operated and controlled by a service provider. The service provider is usually a commercial entity (e.g., local phone company, cable company, Internet service provider) that provides communication services to users. The signaling channels are communication channels reserved by the system for controlling communications between users and between users and system equipment. Various signaling information are conveyed (i.e., transmitted and/or received) between system equipment and user equipment over the signaling channels to properly initiate, maintain and terminate communications between users or communications between user equipment and system equipment.

The signaling channels are operated as per one or more protocols established from one or more standards with which the communication system complies. Protocols are specific rules that dictate how communications between users or communication between user equipment and system equipment are to be managed. Typically, a communication system admits users requesting admission or schedules users on a First Come First Serve (FCFS) basis. Admission to the communication system is the procedure taken by the system to allow a user to have access to and utilize various resources of the system so as to initiate and establish communications with system equipment or with other user equipment via the system equipment. Requesting users are put in a queue in the time order of their request and each is admitted to the system upon its turn if there are sufficient resources available to serve such user. When there aren't sufficient resources for the next requesting user, the system does not admit the requesting user until the sufficient amount of resources becomes available. Thus, a requesting user may have to wait in the queue for a relatively long period of time before it is admitted to the system. Further, one or more other users in the queue may have resource requirements that can be met by the current amount of resources available, but these users are not admitted because it is not their turn to be served; in this manner, the FCFS scheduling technique renders the system inefficient.

Many times, the type of information being conveyed (i.e., transmitted and/or received) by users of the system warrants the use of a scheduling technique other than the FCFS technique. For example, the nature of voice calls using Voice over IP (Internet Protocol) infrastructure is such that the application of the FCFS may lead to low quality voice communications. Further, in third generation wireless communication system (e.g., systems that comply with the 3G-1X Code Division Multiple Access (CDMA) standard), gradations of available resources are made available. For example, in 3G-1X systems, the data rate resource is divided into lower speed channels and higher speed channels for data calls. Data calls are communications established between two users or between user equipment and system equipment where the information being conveyed is data (e.g., digital data) that represent graphics, text, video or any other type of information. Voice calls are established communications between user equipment or between user and system equipment that convey mainly voice signals. In many instances the voice signals are represented as digital information. Voice calls are characteristically distinct from data calls in that data calls are usually time-delay tolerant. Any interruption in the flow of bits for voice traffic signals during an established communication (i.e., a call) would cause discernible noise and in some cases may even make the voice quality unacceptable at a receiving end. Established communications are arrangements and procedures that are implemented as per the protocol and/or standard being followed by the communication system to allow communication signals to be conveyed between system equipment and/or user equipment. What is therefore needed is a technique for efficiently allocating resources to different types of calls by users of a communication system.

SUMMARY OF THE INVENTION

The present invention provides a method for admitting incoming calls to a communication system by allocating resources of the communication system to the incoming calls based on resource parameters obtained from a main scheduler such as the type of call that is requesting admission to the communication system. A resource allocation scheme is provided by a main scheduler and obtained by the method of the present invention. The method of the present invention further obtains the resource usage by the communication system from the main scheduler. The resource usage, the resource allocation scheme and type of incoming call are various resource parameters that are obtained by the method of the present invention from the main scheduler of the communication system. Upon receipt of the resource parameters from the main scheduler, the method of the present invention applies one of N resource distribution algorithms—where N is an integer equal to 1 or greater—to the incoming call depending on the values of the obtained resource parameters. In a preferred embodiment, N is equal to three (3). The three resource distribution algorithms are (1) First Come First Served; (2) Voice over Data or Data over Voice; and (3) High Speed Data Bursting Control. In this manner, the resources of the communication system can be efficiently and fairly distributed to different types of users requesting admission to the communication system.

DETAILED DESCRIPTION

Figure 1:
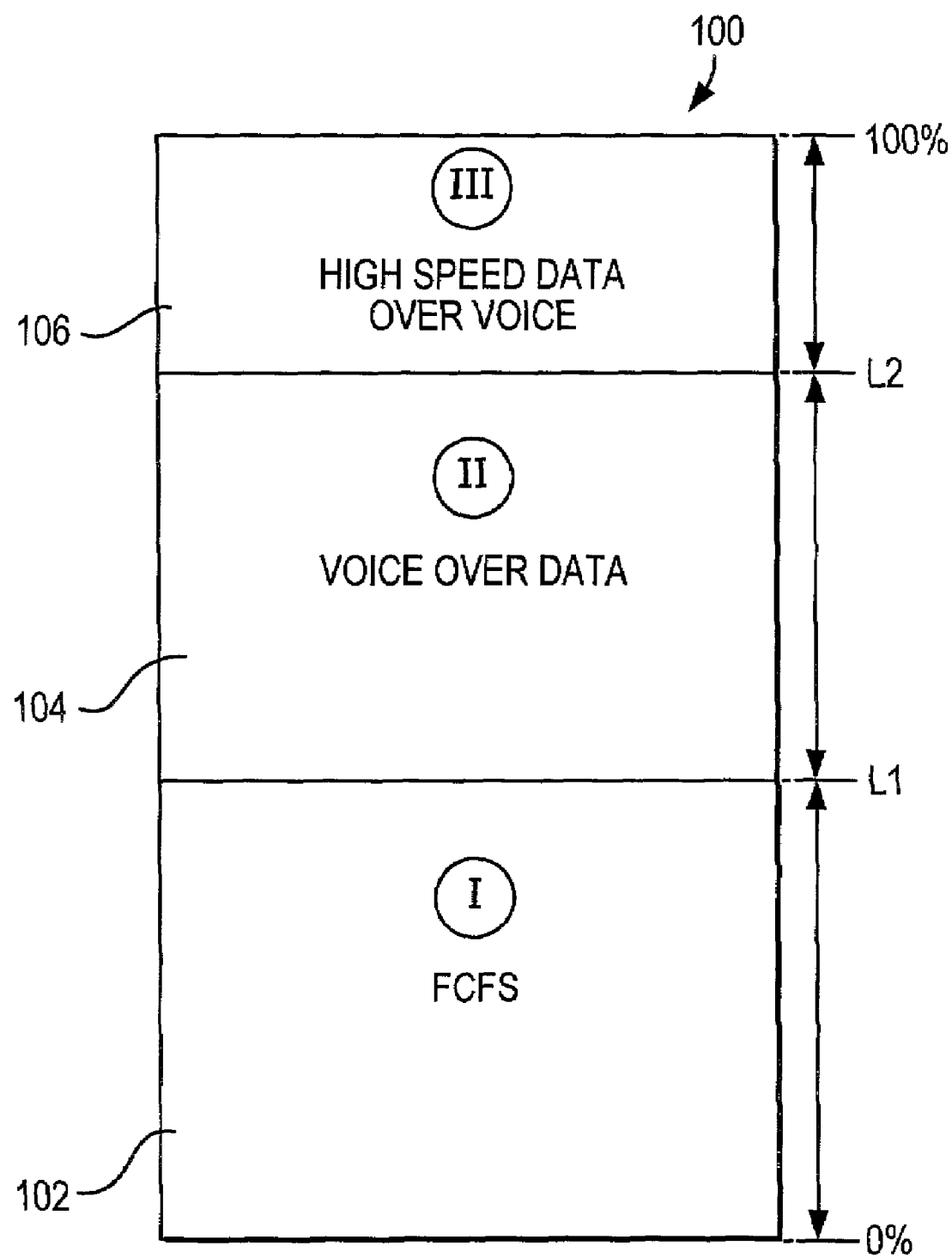
FIG. 1 shows a graphical representation of the resource space of the communication system.

The present invention provides a method for admitting incoming calls to a communication system by allocating resources of the communication system to the incoming calls based on resource parameters obtained from a main scheduler such as the type of call that is requesting admission to the communication system. A resource allocation scheme is provided by a main scheduler and obtained by the method of the present invention. The method of the present invention further obtains the resource usage by the communication system from the main scheduler. The resource usage, the resource allocation scheme and type of incoming call are various resource parameters that are transferred to the method of the present invention from the main scheduler of the communication system. The resource parameters are obtained from system equipment (e.g., main scheduler) and serve as inputs to system algorithms by the method of the present invention through signaling channels or through transfer of information between system equipment coupled to each other. The resource parameters are any type of values or status generated by the system equipment to characterize and/or quantify resources contained in the communication system. Upon receipt of the resource parameters from the main scheduler, the method of the present invention applies one of N resource distribution algorithms—where N is an integer equal to 1 or greater—to the incoming call depending on the values of the obtained resource parameters. In a preferred embodiment, N is equal to three (3). The three resource distribution algorithms are (1) First Come First Served; (2) Voice over Data; and (3) High Speed Data over Voice. Thus, the method of the present invention admits the incoming call to the communication system in accordance with one of the resource distribution allocation schemes that is selected based on the obtained resource parameters. In this manner, the resources of the communication system can be efficiently and fairly distributed to different types of users requesting admission to the communication system.

A resource distribution algorithm is a technique used by the method of the present invention to determine whether to admit a user based on the resources requested by the user and the amount and type of resources made available by the system. The resource usage is the ratio of the amount of resources currently in use to the total amount of resources. The allocation scheme, in essence, is the division of the resource space (i.e., total amount of resources) into a certain number of regions which define which resource distribution scheme is to be used by the method of the present invention. The allocation scheme also includes an apportionment of specific resources for the regions. The main scheduler is system equipment (e.g., programmed processor) that monitors the quantity of each resource that is being used by the communication system at any particular time and is able to determine the resource usage and provide a resource allocation scheme. The main scheduler also knows the total amount of resources contained in the system.

Referring to FIG. 1, there is shown a graphical representation of a resource space that represents the total amount of resources available in the communication system. Resource space 100 is shown as being divided into three regions (or subspaces) with boundaries L1 and L2. The boundaries represent certain percentages of the resource space. For example, L1 may be 40% and L2 may be 80%; this means that region I or subspace 102 represents 40% of all the resources of the system and region II or subspace 104 represents 40% of all the resources. Further, region III or subspace 106 represents 20% of all the resources. The communication system, through the use of a main scheduler or some other device, keeps track of the amount of resources currently in use, the amount of resources available and the resource usage. When the resource usage is known and the boundaries have been defined, then the region in which the communication system is operating can be determined. Still applying the values given above for L1, and L2, if the resource usage is 48%, then the system is operating in region II or subspace 104 and therefore the appropriate resource distribution algorithm to be applied to incoming calls is the "Voice over Data" algorithm as indicated in FIG. 1. The "Voice over Data" algorithm and the other resource distribution algorithms indicated in FIG. 1 (e.g., FCFS, "High Speed Data over Voice") will be described in the context of the flow chart of FIG. 2 representing the method of the present invention.

Figure 2:
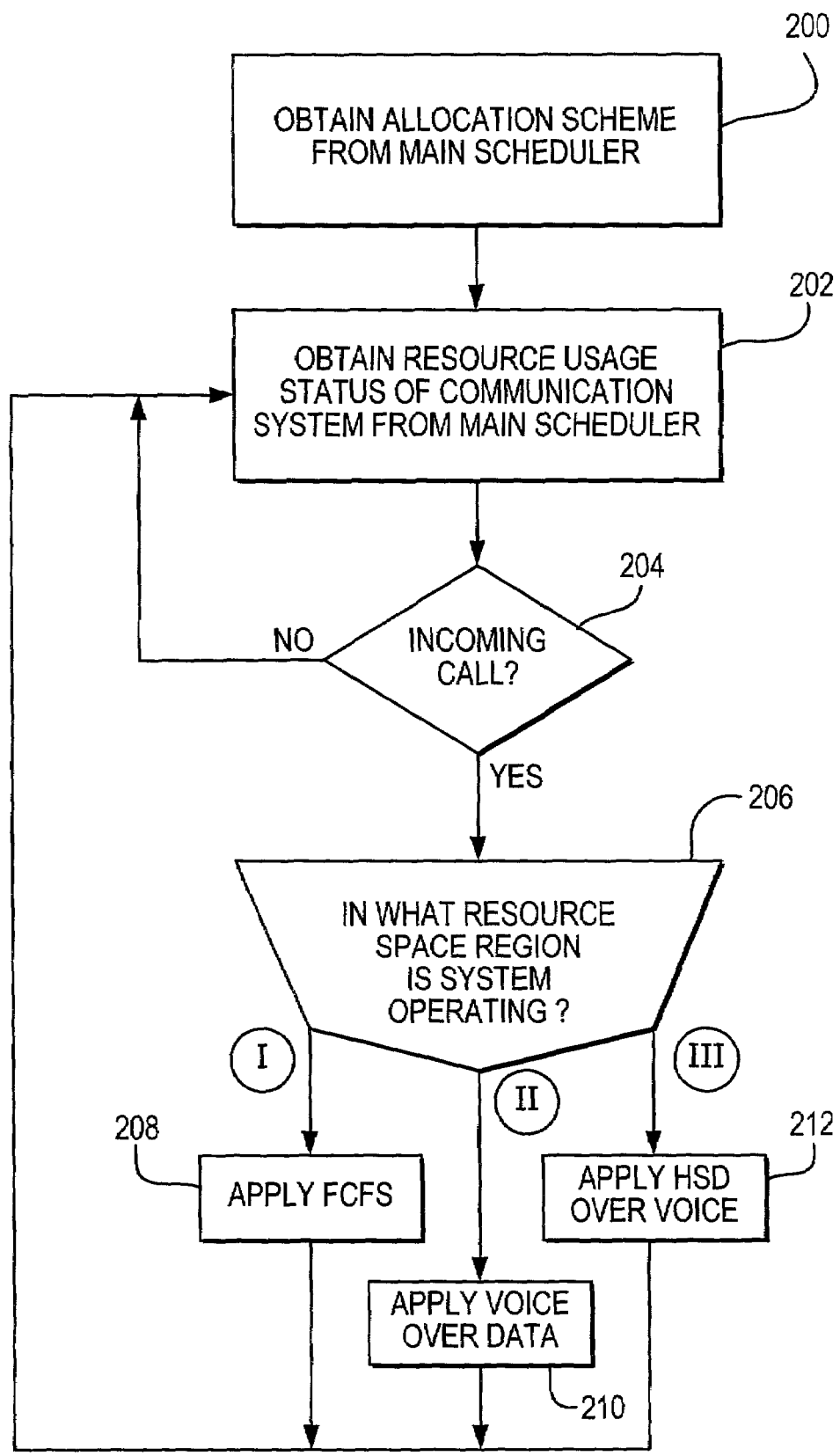
FIG. 2 is a flow chart of the method of the present invention.

Referring now to FIG. 2, the method of the present invention is shown. In step 200, an allocation scheme is obtained from the communication system. Thus, the method of the present invention obtains from the main scheduler or some other portion of the communication system, the values of L1 and L2. The apportionment of resources in the various regions are also obtained by the method of the present invention from the main scheduler. In particular, certain percentages of resources may be more available when the system is operating in certain regions. For example, suppose there are 100 high speed channels available in the system, the allocation scheme may make only 15 of such channels available for region I operation and make 50 such channels available for region III operation. Another resource parameter obtained from the system by the method of the present invention is the type of call that is requesting admission to the communication system. The method of the present invention will obtain from the system the user's request along with the type of call that the request represents. For example, the incoming call may be a voice call. Typically, incoming calls contain information appended to their request which define them as either voice, data calls or any other system defined type of call.

It should be noted that although the resource space is shown divided into three (3) regions or subspaces, the resource space can be divided into any number of regions depending on the number of resource distribution algorithms being used by the method of the present invention. The method of the present invention is certainly not limited to three (3) resource distribution algorithms. More than three or less than three resource distribution algorithms can be used depending on the number of resource distribution algorithms being used by the method of the present invention. Further, the method of the present invention also includes circumstances where more than one resource distribution algorithms can be applied to an incoming call when the system is operating in a certain region.

In step 202, the method of the present invention obtains the resource usage from the main scheduler or some other portion of the communication system. At this point, the method of the present invention has parameters comprising the resource usage and the allocation scheme.

In step 204, the method of the present invention of determines whether there is an incoming call that is requesting admission to the communication system, and if there is, it determines the type of call. An incoming call is communication (initiated by a user) that requests the system to admit the user to the communication system. The request is usually done per a protocol and/or standard that is being followed by the communication system. If there is no incoming call, the method of the present invention returns to step 202 to update the resource usage parameter because that value changes as users leave the system (calls terminated) or are admitted to the system. If there is an incoming call that is requesting admission to the communication system, the method of the present invention moves to step 206.

In step 206, the method of the present invention determines which resource distribution algorithm to apply to the incoming call based on the received parameters, viz., the resource usage, the type of call and the allocation scheme. For example, suppose L1=40% and L2=80% and the resource usage is 48%. Suppose further, that the incoming call requesting admission to the communication system is a voice call. Because the resource usage 48%, the system is currently operating in region II (see FIG. 1) and thus the method of the present invention moves to step 210 to apply the "Voice over Data" distribution algorithm to the incoming call.

Voice Over Data

First, the method of the present invention determines whether the call is a voice call or a data call. The user making an admission request informs the system as to the type of call the user is making by following a particular format established by the communication system. The system or the standard with which the system complies typically has a defined format for signaling information that includes the type of call that is requesting admission. If the incoming call is a voice call, the method of the present invention gives the call priority over any data calls that may be waiting to be admitted; that is, the voice call is admitted before any data call currently requesting admission to the system. If the incoming call is a data call, it is admitted only if there are no voice calls waiting to be serviced and its resource requirements can be met; if its resource requirements cannot be met because there aren't sufficient resources currently available, the incoming call is put into a queue of data calls falling in the same category and waits its turn to be admitted on a FCFS basis. In some cases, incoming data calls may have very different requirements from incoming voice calls, such data calls can be admitted only when they will not affect or use any resources that are needed to admit incoming voice calls.

If the resource usage were such that the system is operating in regions I or III, the appropriate resource distribution algorithm is applied as shown in FIG. 1. When the resource usage is below threshold L1, the system is operating in region I and thus the method of the present invention moves to step 208 wherein the FCFS distribution algorithm is applied.

First Come First Served (FCFS)

When the system is operating in region I, incoming calls are admitted in the order of arrival regardless of whether the calls are voice or data calls. If the resource requirements of an incoming call cannot be met because the specified resources are currently not available, the call waits until resources become available to meet its request and then the method of the present invention admits the call. It should be noted that for region I and any of the other two regions, the amount of resources available is a function of the allocation scheme and the number of users currently admitted in that region. For example, depending on the allocation scheme, a request made by a user for a high speed channel while the system is operating in region I may not have the same number of such channels available as when the system is operating in region III.

When the system is operating in region II, i.e., resource usage is greater than L1 but less than or equal to L2, the "Voice over Data" distribution algorithm (as discussed above) is applied to incoming calls by the method of the present invention. When the system is operating in region III, i.e., resource usage is greater than L2, the method of the present invention moves to step 212 and applies the "High Speed Data over Voice or Data" distribution algorithm to incoming calls.

High Speed Data Over Voice or Data

When the system is operating in region III, the method of the present invention first determines whether an incoming call is a data call or a voice call. If the incoming call is a data call, the method of the present invention further determines whether the data call is requesting High Speed data communication channels. High Speed data communication channels are channel that are able to convey information at relatively higher rates as defined by a standard or the system provider. For example, such communication channels are available in communication systems that comply with the 3G-1X standard and its progeny. Such channels are able to convey such information as streaming video which was not readily available in 2G (second generation) wireless communication systems. Incoming data calls with high speed communication channel requirements are thus given priority over voice calls or other types of data calls (i.e., data calls with no high speed channel requirements). The voice calls or the other types of data calls are admitted on a First Come First Served basis if their resource requirements can be met. If a resource requirement of a voice call cannot be met, but the requirement of a data call (data call with no high speed channel requirement) can be met, then that data call is admitted by the method of the present invention.

It should be noted that the regions can be associated with any types of distribution algorithm. The particular algorithms shown in FIG. 1 are for illustrative purposes. For example, region II can be defined as "Data over Voice" wherein data calls are given priority over voice calls. In this embodiment of the method of the present invention, step 210 now applies a "Data over Voice" algorithm.

Data Over Voice

In some systems, instead of having a "Voice over Data" distribution algorithm, a "Data over Voice" algorithm is used. Such a system may have been designed to handle a larger percentage of data calls than voice calls for example. For the "Data over Voice" distribution algorithm, the method of the present invention first determines whether an incoming call is a data or a voice call. If the incoming call is a data call, it is given priority over any waiting voice calls. Incoming voice calls are admitted only if there are no waiting data calls. In some instances, voice calls may have very different resource requirements from data calls. In such cases where the resource requirements of an incoming voice will not affect the availability of resources for any waiting data calls, then the voice call will be admitted to the communication system by the method of the present invention.

We claim:

1. A method for admitting an incoming call to a communication system, the method comprising:

obtaining resource parameters from system equipment and applying one of N resource distribution algorithms to the incoming call based on the obtained resource parameter values where N is an integer greater than one, one of the distribution algorithms prioritizing one type of incoming call higher than another type of incoming call, a second one of the distribution algorithms prioritizing the one type of incoming call lower than another type of incoming call and where the obtained resource parameters are (1) type of incoming call, (2) resource usage and (3) resource allocation scheme.

2. The method of claim 1 comprising updating the resource usage parameters when there are no incoming calls.

3. The method of claim 1 where the resource allocation scheme comprises boundaries that divide the communication system's resource space into a certain number of regions and apportioning specific resources for the regions.

4. The method of claim 1 where the resource parameters are obtained from a main scheduler of the communication system.

5. The method of claim 1, wherein there are a plurality of high speed channels available for assignment, a first one of the resource distribution algorithms includes permitting access to a first number of the plurality of high speed channels, and a second one of the resource distribution algorithms includes permitting access to a second, different number of the plurality of high speed channels.

6. A method for admitting an incoming call to a communication system, the method comprising:

obtaining resource parameters from system equipment and applying one of N resource distribution algorithms to the incoming call based on resource parameter values, where N is an integer greater than one, where the N resource distribution algorithms comprise (1) first come first served, (2) Voice over Data and (3) High Speed Data over Voice.

7. The method of claim 6 where the distribution algorithm Voice over Data is replaced by a Data over Voice distribution algorithm.

8. The method of claim 6, wherein there are a plurality of high speed channels available for assignment, a first one of the resource distribution algorithms includes permitting access to a first number of the plurality of high speed channels, and a second one of the resource distribution algorithms includes permitting access to a second, different number of the plurality of high speed channels.

9. A method for admitting an incoming call to a communication system, the method comprising:

obtaining resource, parameters from system equipment and applying one of N resource distribution algorithms to the incoming call based on the obtained resource parameter values, where N is an integer greater than one, one of the distribution algorithms prioritizing one type of incoming call higher than another type of incoming call, a second one of the distribution algorithms prioritizing the one type of incoming call lower than another type of incoming call and where more than one resource distribution algorithm is applied to the incoming call.

10. The method claim 9, wherein there are a plurality of high speed channels available for assignment, a first one of the resource distribution algorithms includes permitting access to a first number of the plurality of high speed channels, and a second one of the resource distribution algorithms includes permitting access to a second, different number of the plurality of high speed channels.

11. A method for admitting an incoming call to a communication system, the method comprising:

dividing a communication resource into a plurality of regions;

determining which of the regions corresponds to a current system operating condition; and selecting at least one of a plurality of resource distribution algorithms for admitting the incoming call based upon the determined region corresponding to the current system operating condition, one of the distribution algorithms prioritizing one type of incoming call higher than another type of incoming call, a second one of the distribution algorithms prioritizing the one type of incoming call lower than another type of incoming call.

12. The method of claim 11, comprising assigning a selected distribution algorithm to each of the regions, respectively.

13. The method of claim 11, comprising arranging the regions so that each region corresponds to a selected range of resource usage by the communication system.

14. The method of claim 11, comprising selecting at least one of a first come first served, voice over data, data over voice or high speed data over voice distribution algorithm.

15. The method of claim 11, comprising applying more than one distribution algorithm to the incoming call.

16. The method of claim 11, wherein there are a plurality of high speed channels available for assignment, a first one of the resource distribution algorithms includes permitting access to a first number of the plurality of high speed channels, and a second one of the resource distribution algorithms includes permitting access to a second, different number of the plurality of high speed channels.

* * * * *